US012392196B2

(12) United States Patent
Calton et al.

(10) Patent No.: US 12,392,196 B2
(45) Date of Patent: Aug. 19, 2025

(54) GATE BRACKET

(71) Applicant: VINYL INDUSTRIES, LLC, Lehi, UT (US)

(72) Inventors: Robert Calton, Lehi, UT (US); Dante Leonardo Moreno, Lehi, UT (US)

(73) Assignee: VINYL INDUSTRIES, LLC, Lehi, UT (US)

(*) Notice: Subject to any disclaimer, the term of this patent is extended or adjusted under 35 U.S.C. 154(b) by 379 days.

(21) Appl. No.: 18/303,299

(22) Filed: Apr. 19, 2023

(65) Prior Publication Data

US 2024/0229558 A1 Jul. 11, 2024

Related U.S. Application Data

(60) Provisional application No. 63/478,847, filed on Jan. 6, 2023.

(51) Int. Cl.
*E06B 11/04* (2006.01)
*E05F 7/06* (2006.01)

(52) U.S. Cl.
CPC ................. *E06B 11/04* (2013.01); *E05F 7/06* (2013.01)

(58) Field of Classification Search
CPC .. E06B 11/04; E06B 11/02; E05F 7/06; B60B 33/0052; B60B 33/066
USPC ............................................................ 16/29
See application file for complete search history.

(56) References Cited

U.S. PATENT DOCUMENTS

| | | | | | |
|---|---|---|---|---|---|
| 335,028 | A * | 1/1886 | Giles | E06B 11/04 | 49/396 |
| 2,426,380 | A * | 8/1947 | Swanson | E06B 11/04 | 49/191 |
| 4,748,715 | A * | 6/1988 | Rice | B60B 33/06 | 16/34 |
| 6,073,396 | A * | 6/2000 | Kietzmann | E06B 11/04 | 16/237 |
| 6,092,620 | A * | 7/2000 | Klim | E06C 1/39 | 280/654 |
| 6,871,379 | B2 * | 3/2005 | Ebeling | B60B 33/04 | 16/19 |
| 6,935,000 | B1 * | 8/2005 | Arnaud | E06B 11/04 | 16/DIG. 7 |
| 7,162,772 | B2 * | 1/2007 | Asher | B60B 33/0049 | 16/45 |
| 10,336,135 | B1 * | 7/2019 | Engelbrecht | B60B 33/0063 | |
| 11,913,275 | B2 * | 2/2024 | Torosian | E06B 3/481 | |
| 2010/0038517 | A1 * | 2/2010 | Home | B60B 33/06 | 126/304 R |

(Continued)

FOREIGN PATENT DOCUMENTS

CN 113062682 A * 7/2021 ............... E05D 5/02

*Primary Examiner* — Jeffrey O'Brien
(74) *Attorney, Agent, or Firm* — TechLaw Ventures, PLLC; Terrence J. Edwards

(57) ABSTRACT

A device for mechanically adjusting a component comprising a bracket having a first sidewall and a second sidewall, where the first sidewall comprises a first opening and the second sidewall comprises a second opening. A tapered channel may be formed between the first opening and the second opening. The device further comprises a connector and a receiver that work together with the bracket to provide an adjustment mechanism for supporting and adjusting an angle of incline of a wheeled gate used in fencing or other applications.

21 Claims, 17 Drawing Sheets

(56) References Cited

U.S. PATENT DOCUMENTS

| | | | | |
|---|---|---|---|---|
| 2023/0166560 | A1* | 6/2023 | Schroeder | B60B 19/12<br>16/29 |
| 2023/0347688 | A1* | 11/2023 | Werner | E06B 11/02 |

* cited by examiner

GATE BRACKET

TECHNICAL FIELD

The present disclosure relates generally to fencing, and more specifically but not entirely to a bracket for supporting and adjusting an angle of incline of a wheeled gate used in fencing or other applications. It is to be understood that the device and bracket disclosed herein may be used in other applications beside fencing without departing from the scope of the disclosure.

BACKGROUND

Fencing and gates for fences have existed for quite some time. With the advent of new fencing materials, such as vinyl and plastic polymers for fencing and other structural materials, and other non-metal fencing materials, fencing components have become popular. However, with the popularity of these new fence materials, there are drawbacks. For example, gates have limited ability to suspend from gateposts. Moreover, cantilevered structures need some type of rigid structural support. In addition, some fencing systems and materials do not support rigid corners. Stresses at corners of gates typically exceed the loads supportable by such structures.

For many purposes, fencing is adequately strong, durable, weather resistant, structurally supportive, and the like. However, gates are moving members that are supported from a single side or end. Accordingly, substantial structural integrity is required to a greater degree in a gate than may be required from other fencing components. Moreover, since a gate may be effectively cantilevered, stresses may be substantially higher in portions of a gate, than they would be if merely supporting the weight of a fence structure directly above.

Accordingly, in certain gate systems, a gate itself may be formed of a metal material. Alternatively, the gate may be structurally framed of a metal material, covered with electrostatic powder coating, paint, or vinyl or other polymeric material. However, metal frames exhibit at least the following difficulties. Rigid metal frames are large, bulky to transport, heavy to handle, and problematic to inventory in a large number of size options.

Attempts to remedy the limitations of solid, prefabricated gates or gate frames, result in welds at corners of steel structures. The welds are subjected to substantial stress from twisting under wind loads, slamming, eccentric loading, and various other forces incident to operation of the gate. Thus, assembled metal gate frames or gates lack rigidity, or else they tend to fracture at points assigned the responsibility for rigidity.

Gates are peculiar and have specific problems associated with them that other portions of a fence do not experience. Since gates tend to cover a space or opening having a substantially rectangular aspect, gates lack structural support and rigidity. That is, any four member structure (quadrilateral) is fundamentally unstable. Making a gate from some materials to serve as structural members is often untenable. Thus, a fence of any material may still require a metal gate.

Torsional rigidity is difficult in a gate because a gate structure is typically dominated by two dimensions, namely a vertical dimension and a horizontal dimension, in which the gate extends. The transverse direction through the gate is typically orders of magnitude less than that of the longitudinal (vertical) or lateral (horizontal) dimension along the expanse of the gate. Accordingly, forces in a transverse direction (through the gate) typically tend to twist one corner about the next two proximate corners. Thus, gate structures often break near the corners thereof due to torsion from loading transversely through the gate against any one of the corners.

In order to obtain maximum strength and stiffness, a tubular member represents a nearly optimal configuration. Rectangular tubular cross sections and circular tubular cross sections provide very stiff structures. Tubular members may be welded and braced to form comparatively strong gates. In order to stabilize the longitudinal and lateral dimensions of a gate structure, a diagonal brace or support may extend from an upper corner (inside) near a hinging mechanism down to an opposite lower corner (outside) that swings as the gate opens. Thus, a comparatively unobtrusive, but strong gate support may greatly benefit from the rectangular structure.

However, the overall lifetime of a gate structure begins with production of stock materials from which to construct a gate. Many materials are long. That is, one may define an aspect ratio as a relationship of one linear dimension to another linear dimension (typically in a direction orthogonal to the first). An aspect ratio may be thought of as a ratio of the relative aspects of the two dimensions. Gates may have an aspect ratio near unity for their longitudinal and lateral and longitudinal dimensions, but much smaller or greater for others (e.g., transverse: lateral longitudinal: transverse).

When materials are shipped from a source of raw stocks or from a manufacturer of gate hardware to a reseller or customer, total shipping weight is important. Moreover, total shipping volume is important. Shipping costs may increase with excess weight or with excess volume (cubic feet). Thus, a load may “gross out” a hauling vehicle if the weight reaches the maximum vehicle weight permissible. A load may “cube out” a hauling vehicle if the volume of packaging containing goods fills the entire available volume. Ideally, a load grosses out and cubes out a hauling vehicle at about the same point (same number of products). A vehicle grossed out could carry more volume if the volume were not so heavy. A vehicle that is cubed out could haul more weight if the weight did not fill up or require so much volume.

As this applies to gate hardware, maximum structural reliability is required at a minimum weight and minimum shipping volume. Traditionally, gate frames have been manufactured as rigid structures fully assembled. Often, gate frames are welded structures for supporting other gate materials, such as slats, pickets, panels, and the like. As a practical matter, tubular steel may be formed into rectangular structures to serve as gate frames. Whereas other gate materials may be shipped as long stocks, gates become large in two dimensions. Meanwhile, the tubular steels available for welding are often very heavy, comparatively, with respect to other gate materials (especially plastics such as vinyl).

Additionally, gates in fencing systems face another challenge when positioned on a slope or incline. It can be difficult to know in advance the precise angle needed when manufacturing brackets to join gate frames. Welding those brackets can be time consuming and tedious, and adjusting those brackets in the event of a miscalculation can be even more costly. What is needed is a simpler, modular, adjustable bracket whereby a user may simply and conveniently make incline adjustments to suit whatever gate or slope grade that is required specific to his or her needs instead of using welding techniques to weld a lateral structural support member at a certain angle, which is time consuming and costly.

SUMMARY

A device for mechanically adjusting a component comprises a bracket having a first sidewall and a second sidewall, the first sidewall comprising a first opening, the second sidewall comprising a second opening. The bracket further comprises a tapered channel that is formed between the first opening and the second opening. The device further comprises a connector and a receiver that work together with the bracket to provide an adjustment mechanism for supporting and adjusting an angle of incline of a gate used in fencing or other applications.

A system includes a gate and a bracket assembly. The bracket assembly comprises a bracket, a connector, and a receiver that work together to provide an adjustment mechanism for supporting and adjusting an angle of incline of the gate used in fencing or other applications. The bracket comprises a base, a surface defining a channel, a first opening, and a second opening. The bracket further comprises a tapered surface formed between the first opening and the second opening.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Disclosed herein are devices, systems, and methods for supporting and adjusting an angle of incline of a gate used in fencing or other applications. It is to be understood that the device and bracket disclosed herein may be used in other applications beside fencing without departing from the scope of the disclosure.

An implementation of the disclosure is a device for mechanically adjusting a component comprising a bracket having a first sidewall and a second sidewall, where the first sidewall comprises a first opening and the second sidewall comprises a second opening. The second opening may have a larger diameter than the first opening, where a tapered channel may be formed between the first opening and the second opening. The device further comprises a connector and a receiver that work together with the bracket to provide an adjustment mechanism for supporting and adjusting an angle of incline of a wheeled gate used in fencing or other applications.

It will be readily understood that the components of the present disclosure, as generally described and illustrated in the figures herein, could be arranged and designed in a wide variety of different configurations. Thus, the following more detailed description of the system of the present disclosure, as represented in FIGS. 1 through 8, is not intended to limit the scope of the disclosure. The scope of the disclosure is as broad as claimed herein. The illustrations are merely representative of certain implementations of the disclosure. Those implementations of the disclosure of the disclosure will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only by way of example, and simply illustrates certain implementations consistent with the disclosure as described and claimed.

Figure 1:
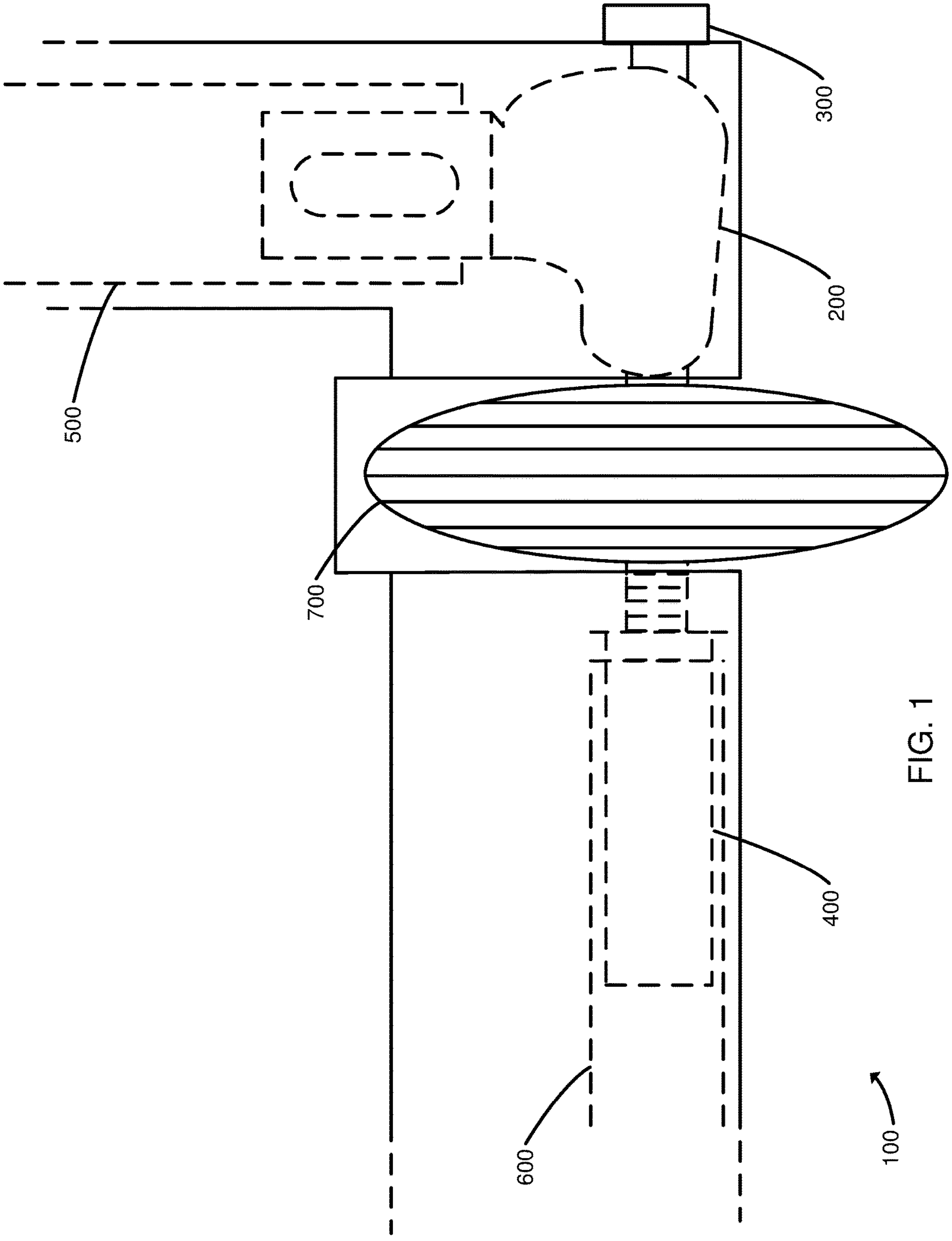
FIG. 1 illustrates a schematic diagram of a cutaway view of a system according to the principles of the present disclosure.

Referring now to the figures, FIG. 1 illustrates a schematic diagram of a bracket system 100. The system may comprise a bracket 200. The system may further comprise a connector 300 that may be fed through the bracket 200 and joined to a receiver 400. A vertical structural support 500 may join to the bracket 200. A horizontal structural support 600 may join to the receiver 400. A wheel 700 may be positioned adjacent to the bracket 200. The connector 300 may feed through both the bracket 200 and wheel 700 before joining with the receiver 400.

Figure 2A:
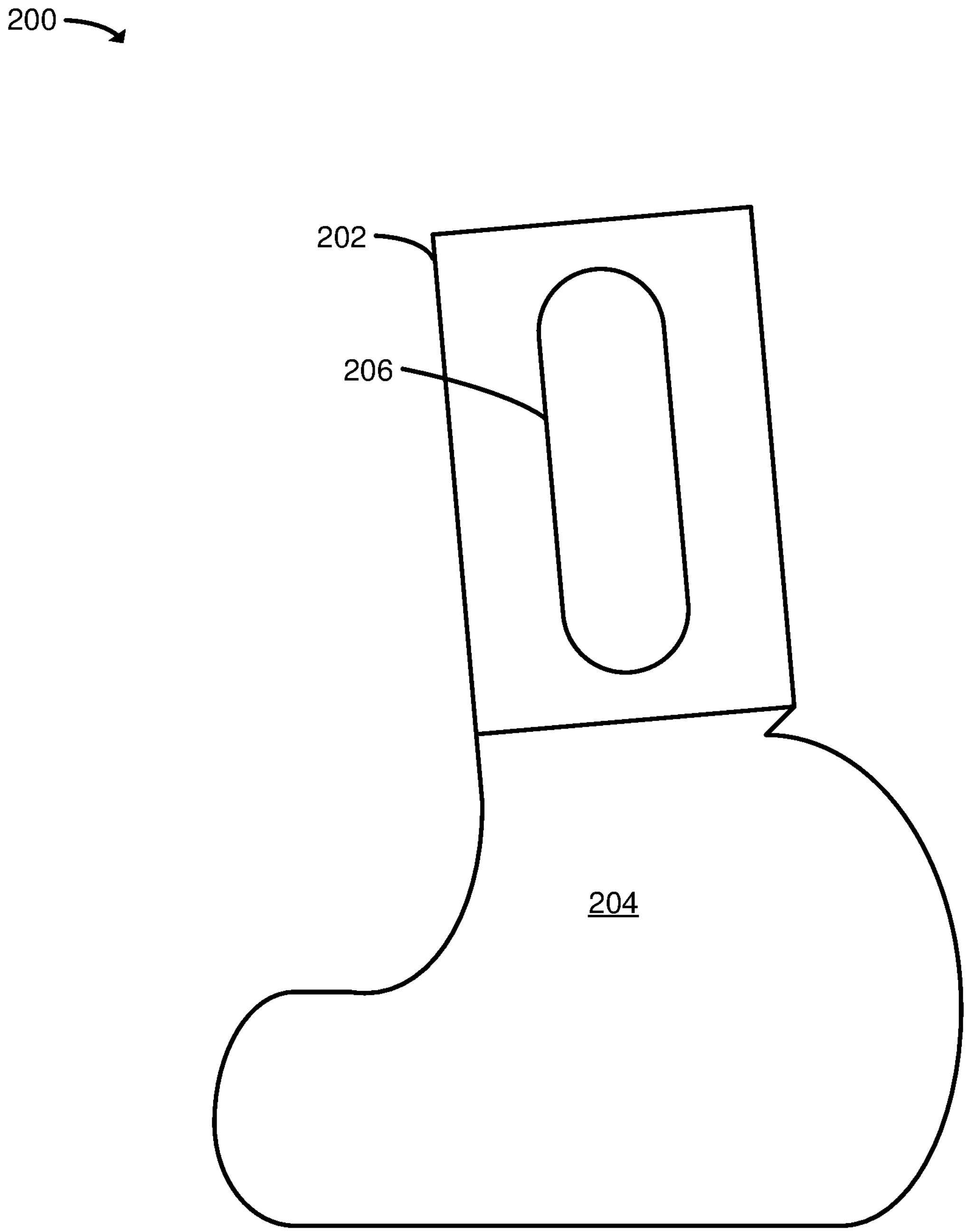
FIG. 2A illustrates a schematic diagram of a sideview of a bracket according to the principles of the present disclosure.
Figure 2B:
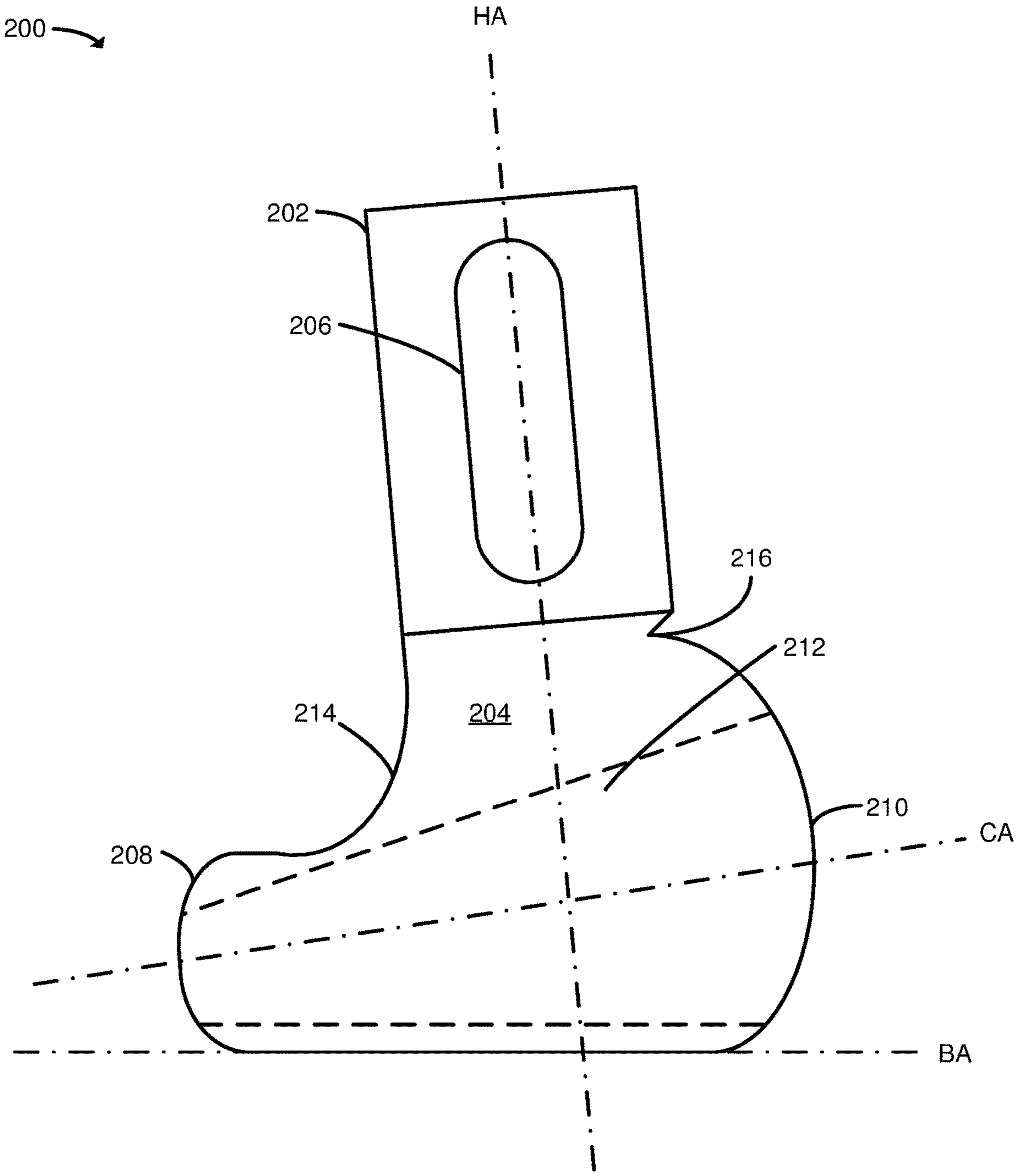
FIG. 2B illustrates a schematic diagram of a cutaway sideview of a bracket according to the principles of the present disclosure.

FIG. 2A illustrates a schematic diagram of a side view of a bracket 200 according to the principles of the present disclosure. A bracket may comprise an upper and lower portion comprising a head 202 and a base 204 respectively. The head and base may be one contiguous construct in some implementations, while in others they may be separate, modular pieces. The head 202 may comprise a recess 206. Relative to the base, the head may be positioned offset to the base, such that a vertical axis of the head may be offset to perpendicular to a horizontal axis of the base in some implementations. In other implementations the head may be positioned such that a vertical axis of the head may be perpendicular to a horizontal axis of the base. FIG. 2B illustrates a schematic diagram of a cutaway view of a bracket according to the principles of the present disclosure. The base 204 may comprise a front edge 208 comprising a front through-hole (as seen in FIG. 2D) and a rear edge 210 comprising a rear through-hole (as seen in FIG. 2D), with both the front edge 208 and rear edge 210 having a cavity forming a channel 212 between the front through-hole and the rear through-hole. The front edge 208 and rear edge 208 may have an overall rounded curve shape to each edge in some implementations. In some implementations the size of the front through-hole may be differently sized from the rear through-hole, such that one though-hole may be larger than the other. The through-holes may be sized at a 2:1 ratio, 3:1 ratio, or some other ratio, and as a specific example may be a ratio of 2.4:1 to 2.7:1, or 2.5:1 to 2.6:1 in some other examples. In such implementations the shape of the channel may be an overall frustoconical shape. In other implementations the through-holes may be similarly sized. The base 204 may additionally have a slope 214 and a notch 216. The slope 214 and notch 216 may be sized to facilitate attachment of other components in a way that allows for clearance of movement of those components such that the bracket is easily installable and adjustable. In some implementations the bracket 200 may be shaped and sized such that the head 202 may be positioned on a vertical axis HA offset to perpendicular to a horizontal axis BA defined by a bottom surface of the base 204. The head may additionally be positioned on a vertical axis HA perpendicular to a horizontal axis CA defined by the channel 210.

Figure 2C:
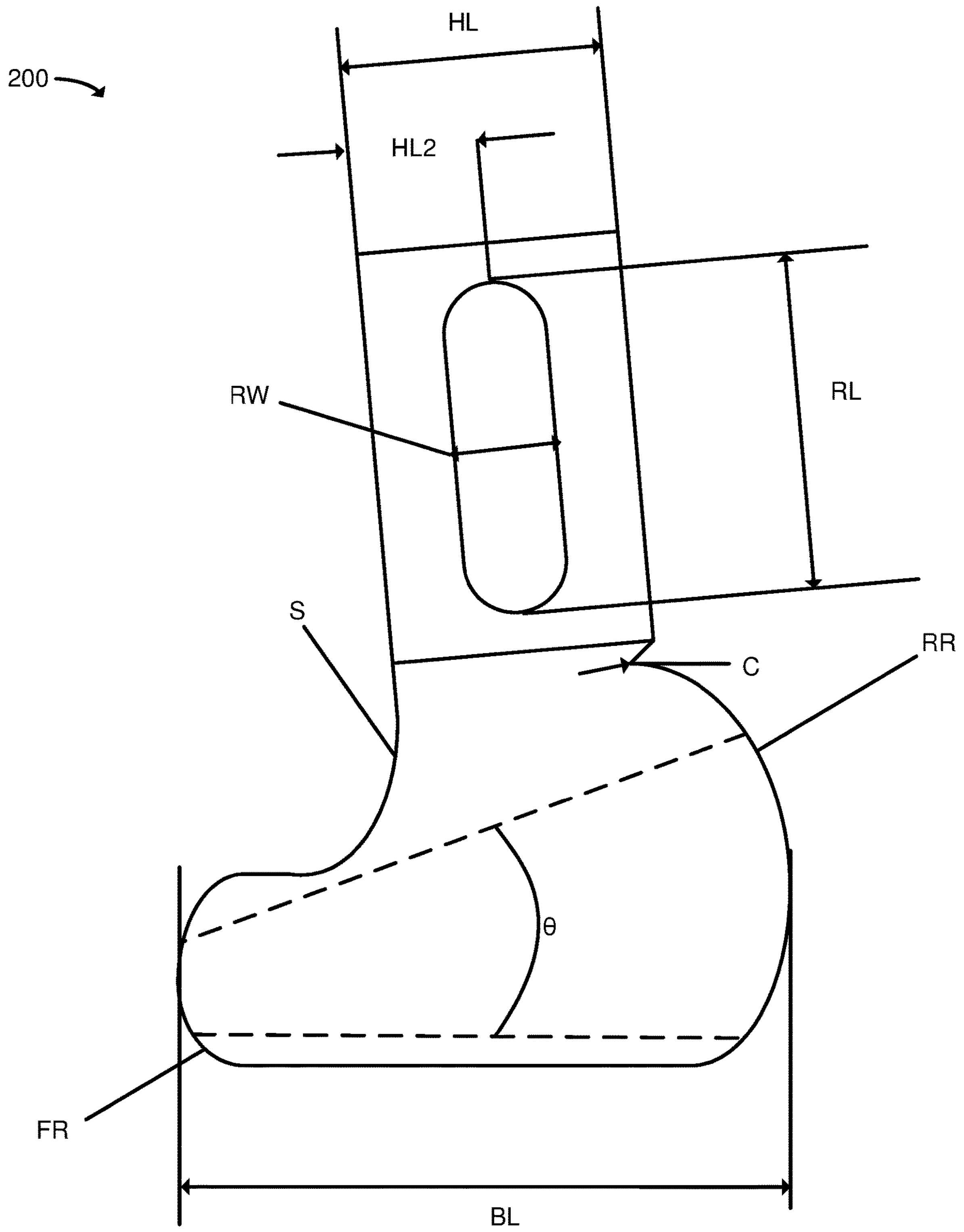
FIG. 2C illustrates a schematic diagram of measurements of a sideview of a bracket according to the principles of the present disclosure.
Figure 2D:
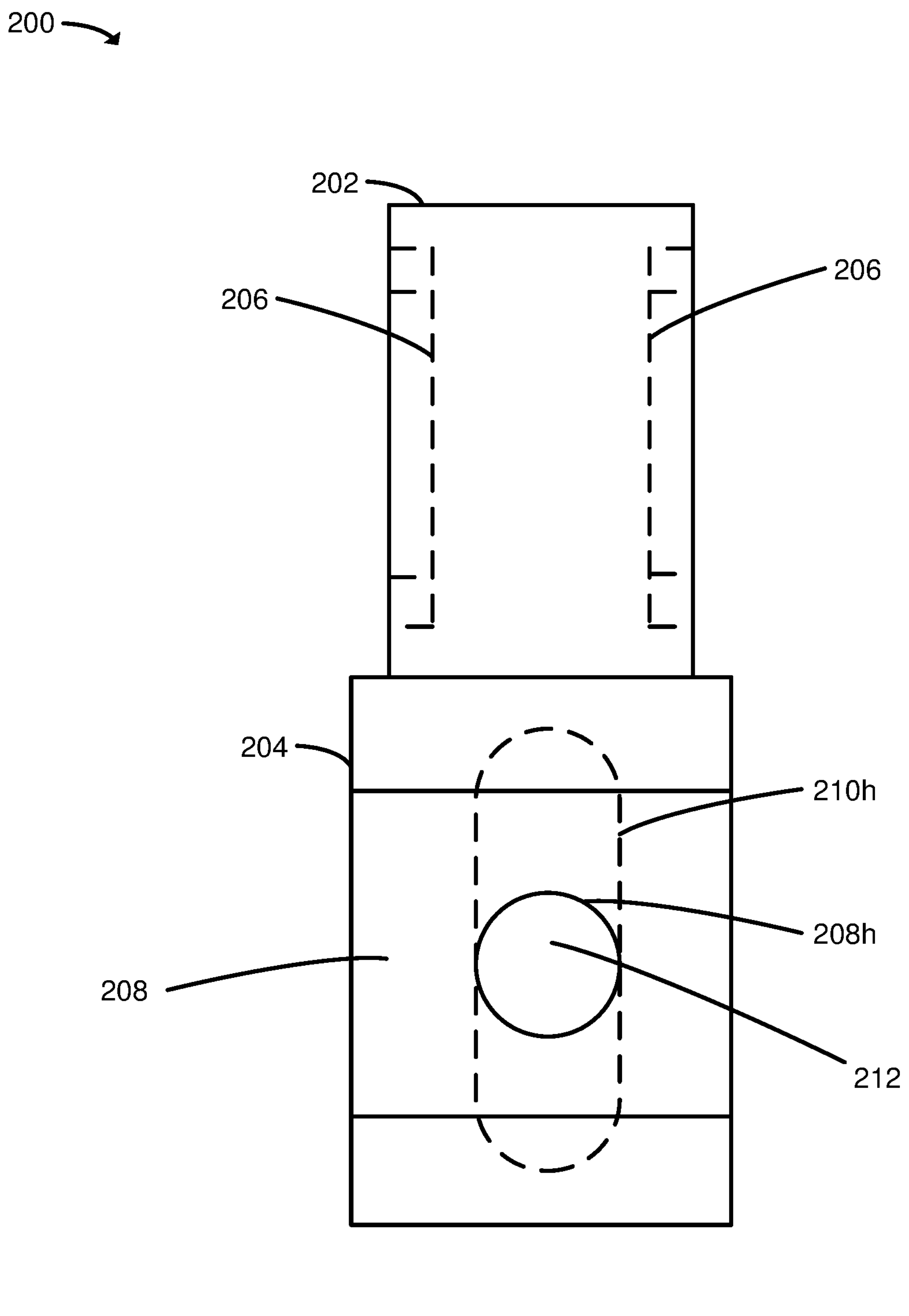
FIG. 2D illustrates a schematic diagram of a front view of a bracket according to the principles of the present disclosure.

FIG. 2C illustrates a schematic diagram of a cutaway sideview of a bracket 200 showing exemplary relative measurements according to the principles of the present disclosure. A bracket head may have a length of the head HL and a length from one end of the head to the peak of the recess HL2. The recess may have a length RL and a width RW. Size and scale of a bracket may vary according to user specification. As a specific but nonlimiting example, in one implementation, a bracket may have a head length HL ranging from 0.750 inches to 2.000 inches and may be about 1.35 inches, for example. HL2 may have a length ranging from 0.500 inches to 1.000 inch and may be about 0.674 inches, for example. HL2 may measure approximately half the length of HL. Recess length RL may range from 0.500 inches to 3.000 inches depending on the implementation and may be about 1.500 inches, as an example. Recess width RW may range from 0.200 inches to 1.000 inch and may be about 0.500 inches, for example. In some implementations the recesses on each side of the head may be similarly sized, while in other implementations they may be sized differently according to a user's needs. In some implementations a head may only comprise a single recess on one surface of the head.

The base may have a front upper radius S, a notch C, and a front edge measured by a fore radius FR, and a rear edge measured by a rear radius RR. The channel may have a taper angle θ. In some implementations a front upper radius S may have a length ranging from 0.250 inches to 1.000 inch, and may be about, for example, 0.500 inches. The notch C may measure between 0.0300 inches to 0.0900 inches and be about 0.630 inches in some implementations. A fore radius FR may measure from 0.500 inches to 1.500 inches, and may be, in some implementations, 1.000 inches. A rear radius RR may have a length from 1.250 inches to 3.750 inches, and in some implementations may be 2.500 inches. In some implementations the rear radius may be roughly 2.5 times the length of the fore radius. The taper angle θ may measure at a midpoint from 10° to 50° at that midpoint, with an angle of 30° in some implementations, with larger or smaller sizes possible relative to the scale of the bracket.

FIG. 2D illustrates a schematic diagram of a front view of a bracket 200 according to the principles of the present disclosure. As seen from the front view, the rear through-hole 210*h* disposed within the rear edge (as seen in FIG. 2B) may be differently sized from the front through-hole 208*h* disposed within the front edge 208. The size difference between the front through-hole 208*h* and the rear through-hole 210*h* may result in a tapering of the channel 212, whereby the channel begins with a diameter of that of the larger through-hole and tapers down to the diameter of the narrower through-hole. Depending on the implementation, the front through-hole 208*h* may be larger than the rear-through hole 210*h*, or vice versa. In some implementations the front through-hole 208*h* and rear through-hole 210*h* may be evenly or otherwise comparatively sized. The head 202 may have a recess 206 on one or both sides of the head 202. The notch 216 may span the width of the base 204 in some implementations, while in others it may only reach a portion of that width. In implementations where the notch 216 is shorter than the width of the base 204, the notch 216 may be positioned anywhere with respect to the width of the base 204.

Figure 2E:
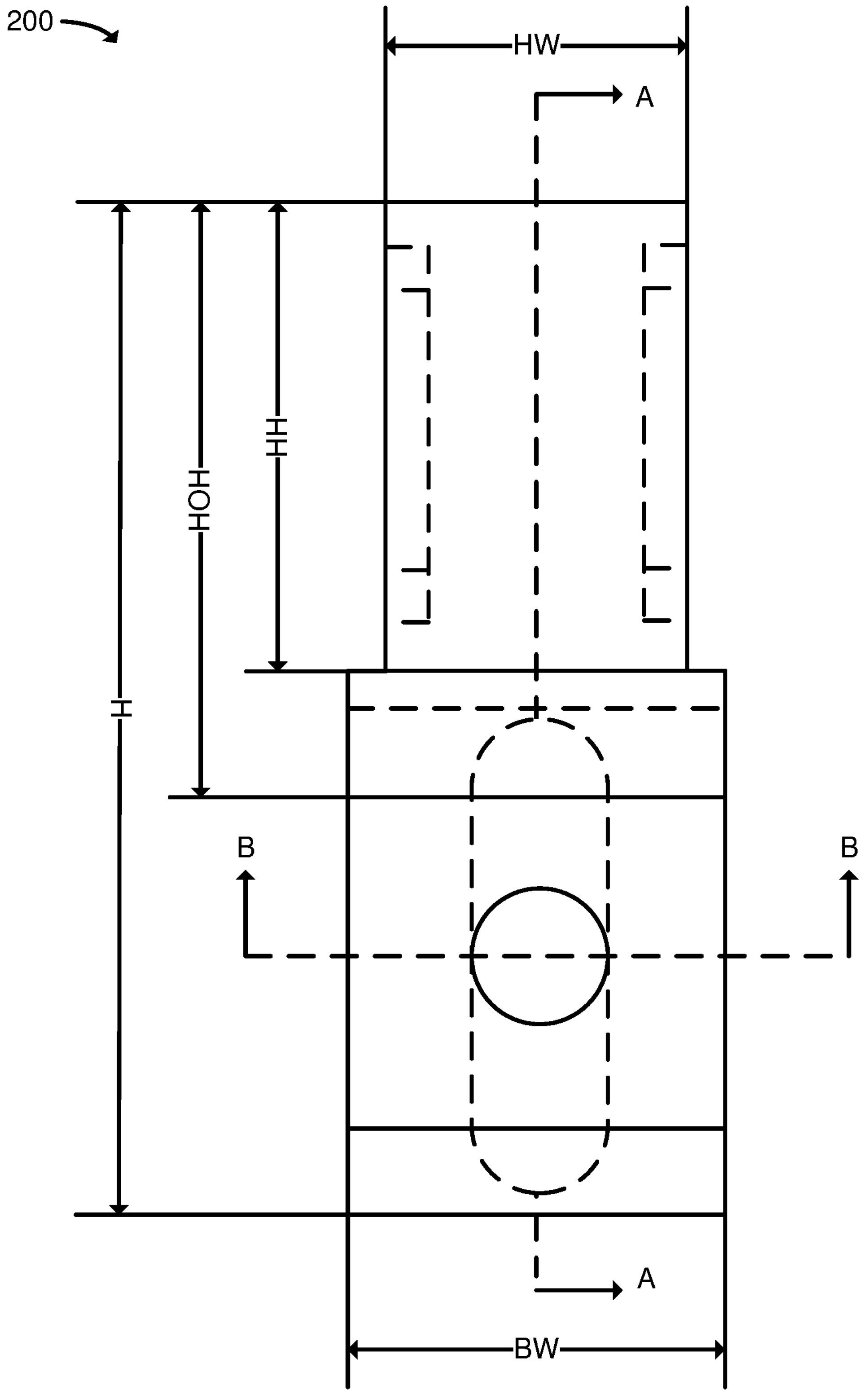
FIG. 2E illustrates a schematic diagram of measurements of a front view of a bracket according to the principles of the present disclosure.
Figure 2F:
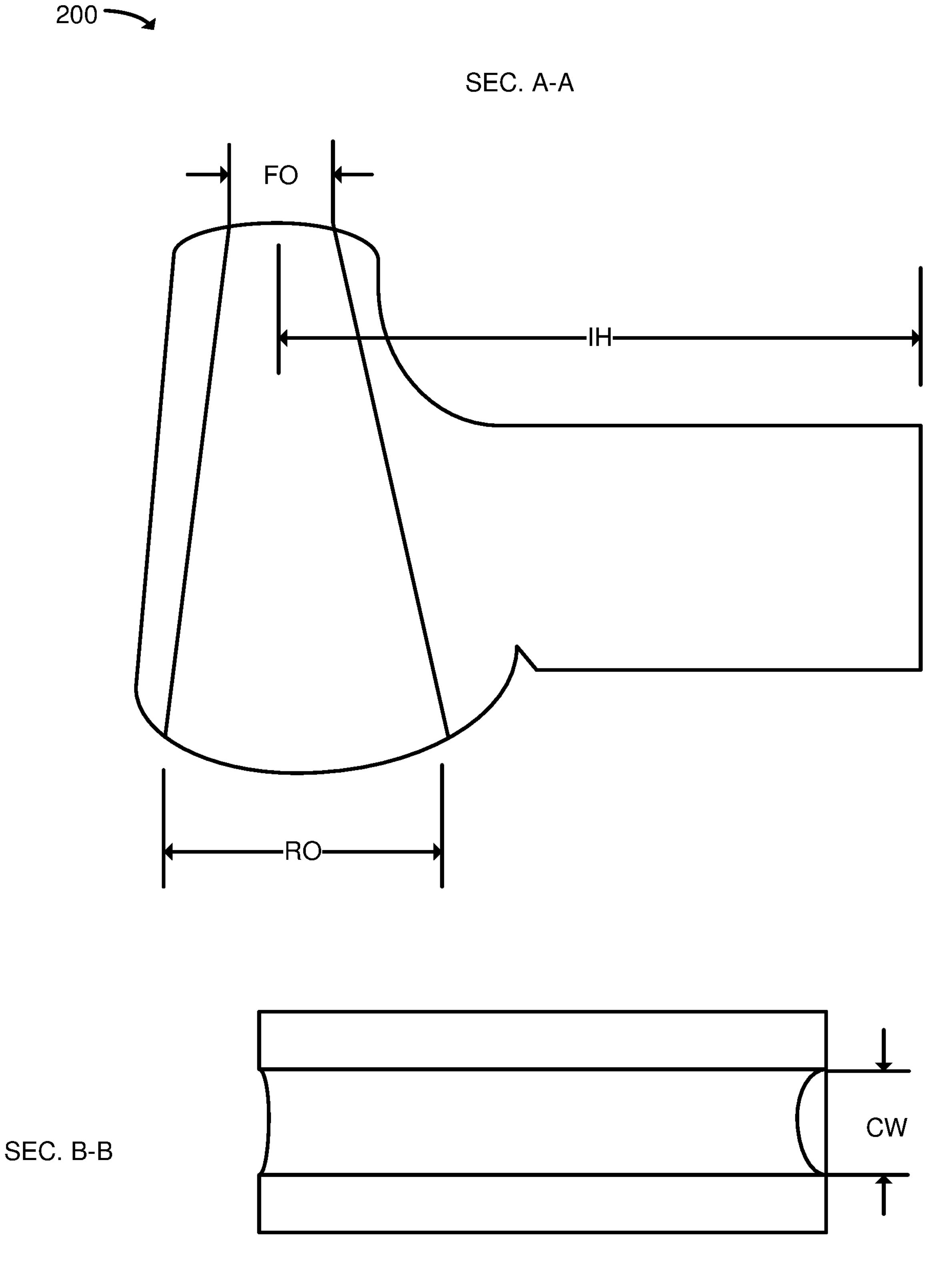
FIG. 2F illustrates a schematic diagram of cross-sectional views A-A and B-B illustrated in FIG. 2E of a bracket according to the principles of the present disclosure.

FIG. 2E illustrates a schematic diagram of a rear view of a bracket 200 showing exemplary relative measurements according to the principles of the present disclosure. In a specific but nonlimiting example, in one implementation, the head may have a head width HW and a head height HH. The base may have a base width BW. Head to rear through hole opening HOH. The bracket may have an overall height H. Line A-A showing cutaway dimensions seen in FIG. 2C. The head width HW may measure in a range from 0.750 inches to 2.000 inches, with a possible width of 1.350 inches, depending on the implementation. The head height HH may measure from 1.000 inches to 3.000 inches, with a possible height of 2.000 inches in some implementations. The overall bracket height H may measure in a range from 3.000 inches to 6.000 inches, with 4.365 inches as an example. The base width BW may measure from 0.800 inches to 2.750 inches, with a width of 1.475 inches as a possible example. A height HOH from the top of the head to a midpoint of the channel may measure between 1.800 inches to 3.200 inches, with a possible height of 2.625 inches as an example. FIG. 2C illustrates a schematic diagram of a cross-section view of a bracket according to cross-section A-A and cross-section B-B as marked in FIG. 2B. As seen in cross-section A-A, a bracket may have an internal height IH measuring from a center point of a length ranging from a front opening FO to a rear opening RO. The internal height IH may measure from 1.650 inches to 6.000 inches, with a possible height of 3.300 inches as an example. The front opening FO may measure from 0.341 inches to 1.300 inches, with a possible length of 0.680 as an example. The rear opening RO may measure from 0.950 inches to 2.500 inches, with a measurement of 1.900 as a possible example. In some implementations, the size of the front opening FO relative to the rear opening RO may be a ratio of about 1:3. Seen in cross-section B-B, a channel width CW may have a measurement of between 0.300 inches to 0.900 inches, with a possible width of 0.625 inches as an example. Other measurements and relative ratios may be possible relative to the size of the bracket.

Figure 3:
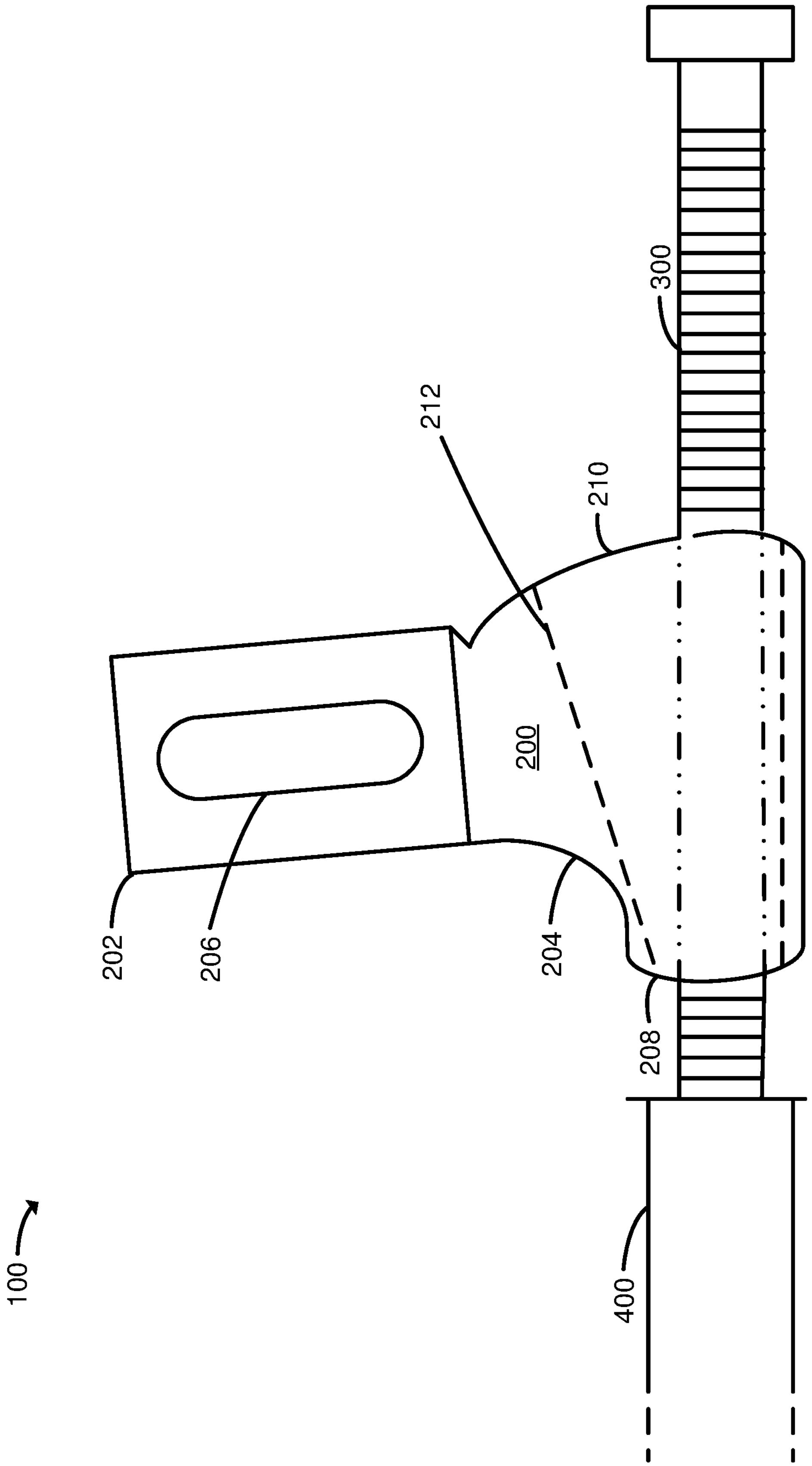
FIG. 3 illustrates a schematic diagram of a cutaway sideview of a bracket having a male connector fed therethrough and a female receiver according to the principles of the present disclosure.

FIG. 3 illustrates a schematic diagram of a side view of a bracket 200 according to the principles of the present disclosure featuring a connector 300 and a receiver 400. The connector 300 may be fed through the front though hole of the front edge 208 or rear through-hole of the rear edge 210, through the channel 212, and out of the opposing side. The connector 300 may be received by a receiver 400. In some implementations the connector 300 may screw in via threads disposed on the surface of the connector 300 or otherwise slidably fit into the receiver 400 and utilize some securing means to secure the connector 300 to the receiver 400. The connector may be able to pivot within the larger rear through-hole of the rear edge 210 to influence an angle of the bracket 200 or the angle of the connector 300 within the bracket 200. The front edge 208 and rear edge 210 may each have a rounded, radial surface in order to facilitate movement of the bracket relative to the connector 300 or the receiver 400.

Figure 4A:
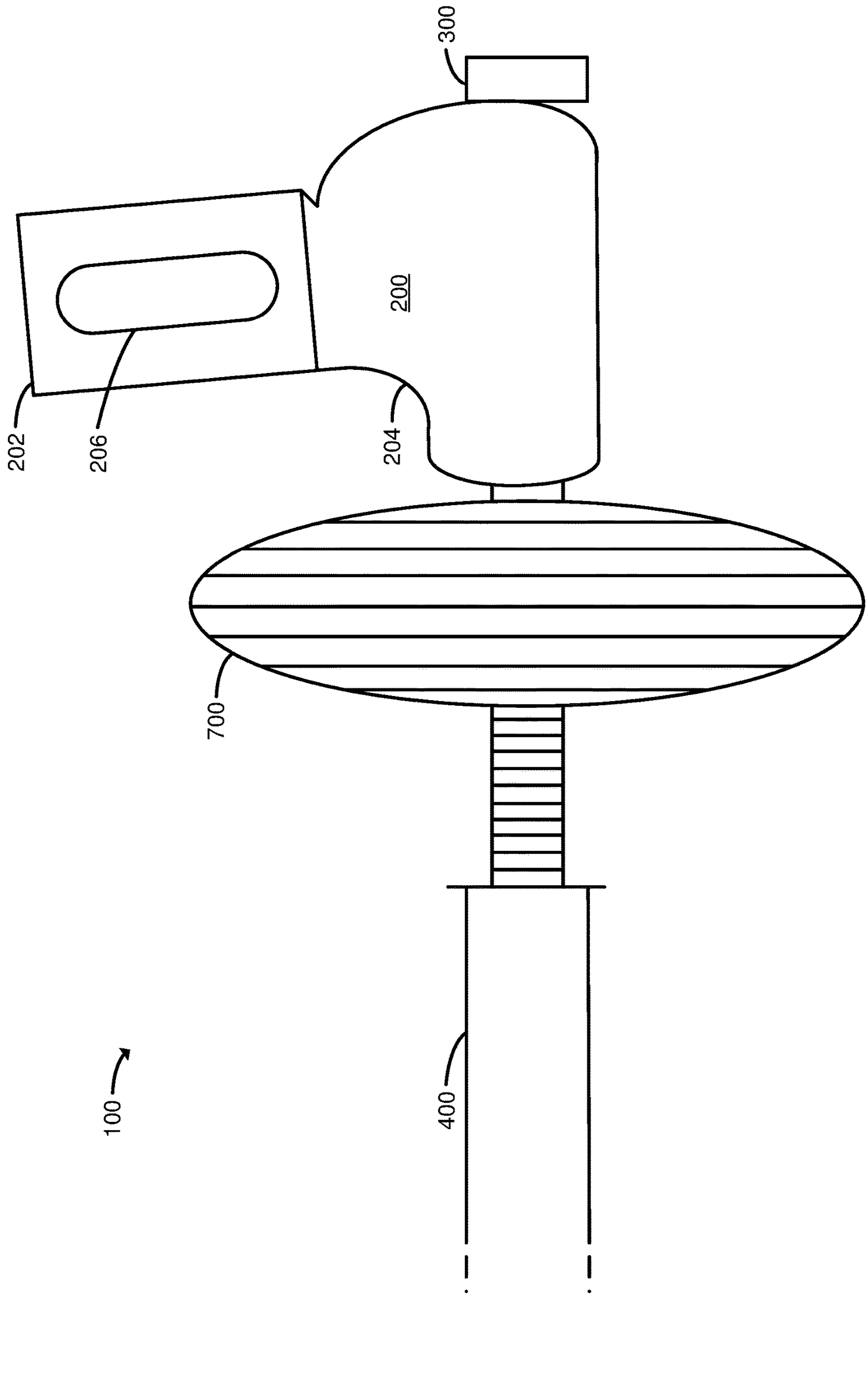
FIG. 4A illustrates a schematic diagram of a sideview of a bracket having a male connector fed therethrough and a female receiver together supporting a wheel according to the principles of the present disclosure.

FIG. 4A illustrates a schematic diagram of a side view of a bracket 200 according to the principles of the present disclosure featuring a wheel 700. The connector 300 may be fed through a wheel 700 before feeding into the receiver 400 such that the bracket base 204 is secured to the wheel 700 via the connector 300 and receiver 400. The wheel 700 may be any size or shape capable of receiving the connector 300. The connector 300 may be fed through either end of the wheel 700 and the wheel 700 may be positioned on either side of the bracket 200 according to the implementation.

Figure 4B:
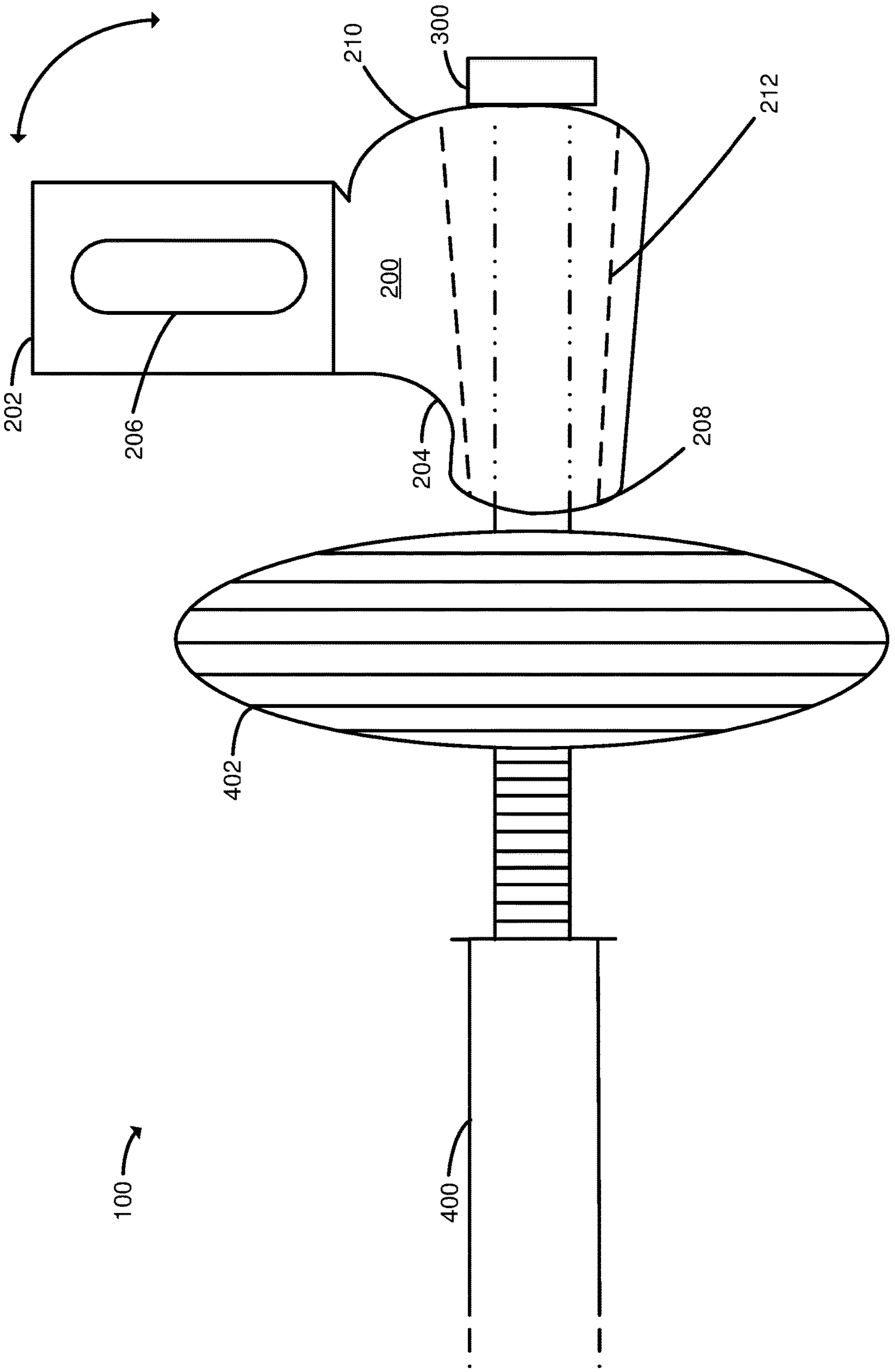
FIG. 4B illustrates a schematic diagram of a cutaway sideview of a bracket having a male connector fed therethrough and a female receiver together supporting a wheel according to the principles of the present disclosure.

FIG. 4B illustrates a schematic diagram of a side view of a bracket 200 according to the principles of the present disclosure. In implementations where either the rear through-hole of the rear edge 210 or the front through-hole of the front edge 208 are differently sized, a rotational angle of the bracket 200 may be adjusted by pivoting the end of the connector 300 or adjusting the base 204 of the bracket itself. Compared to earlier described figures, such as FIG. 3, the bracket 200 may be rotated in place such that the head 202 is more upright. A user may freely adjust the angle of the bracket 200 in this way in order to accommodate any angle of fencing or gate or other use of the bracket 200. Adjusted angles may accommodate different degrees of angles of fence framing, or a slope of a surface on which the wheel 700 is intended to rest.

Figure 5A:
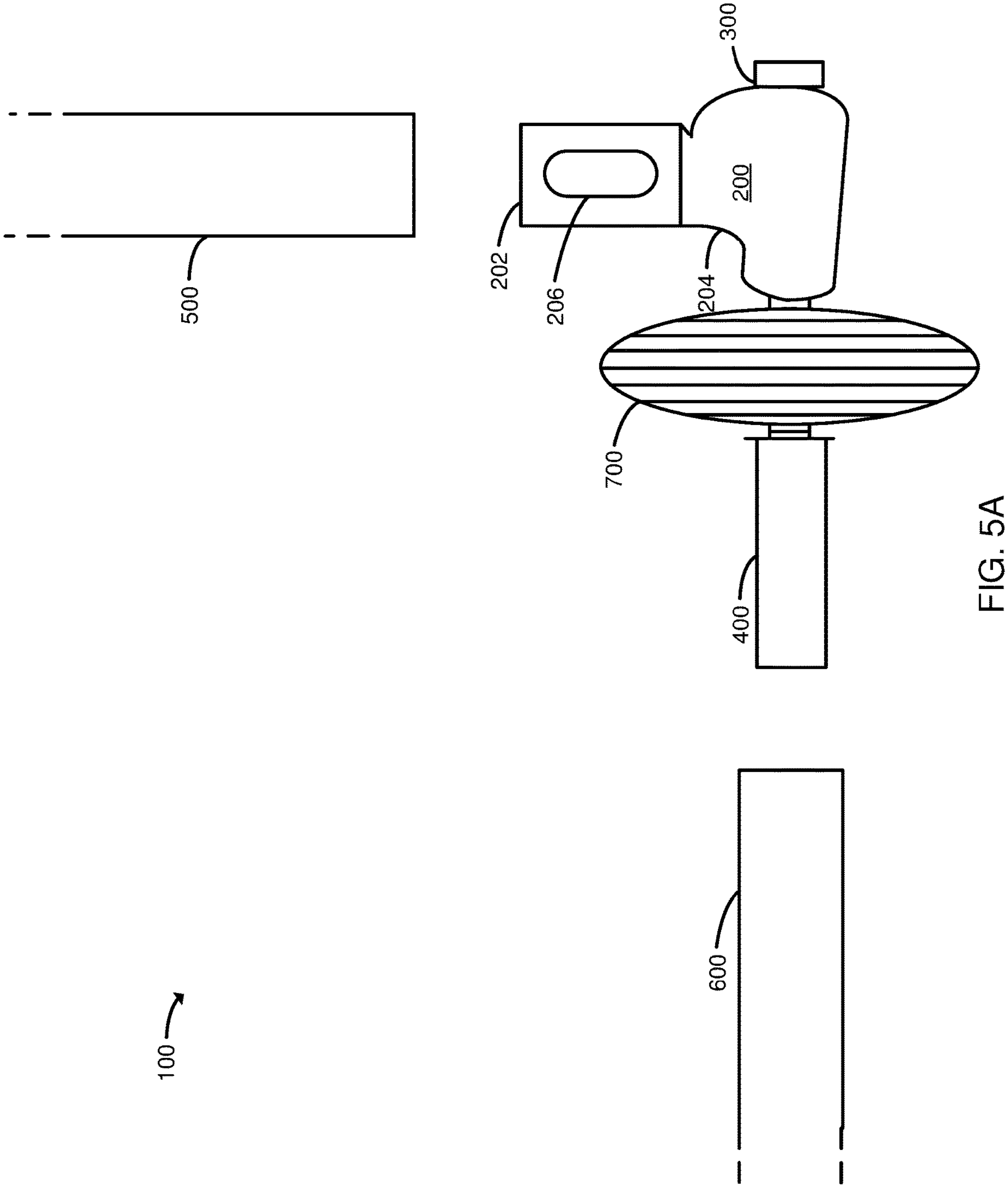
FIG. 5A illustrates a schematic diagram of a sideview of a bracket having a male connector fed therethrough and a female receiver together supporting a wheel, altogether poised to receive structural supports.

FIG. 5A illustrates a schematic diagram of a side view of a bracket 200 according to the principles of the present disclosure. With a wheel 700 secured to a bracket base 204 via a connector 300 and receiver 400, a user may then attach a vertical structural support 500 and a horizontal structural support 600 to the system 100. The vertical structural support 500 and horizontal structural support 600 may be constructed of aluminum, galvanized tubing, or other comparable material that is structurally able to support a load. The bracket 200 may be used to join one or more support structures to form a corner of a gate or similar door or panel.

Figure 5B:
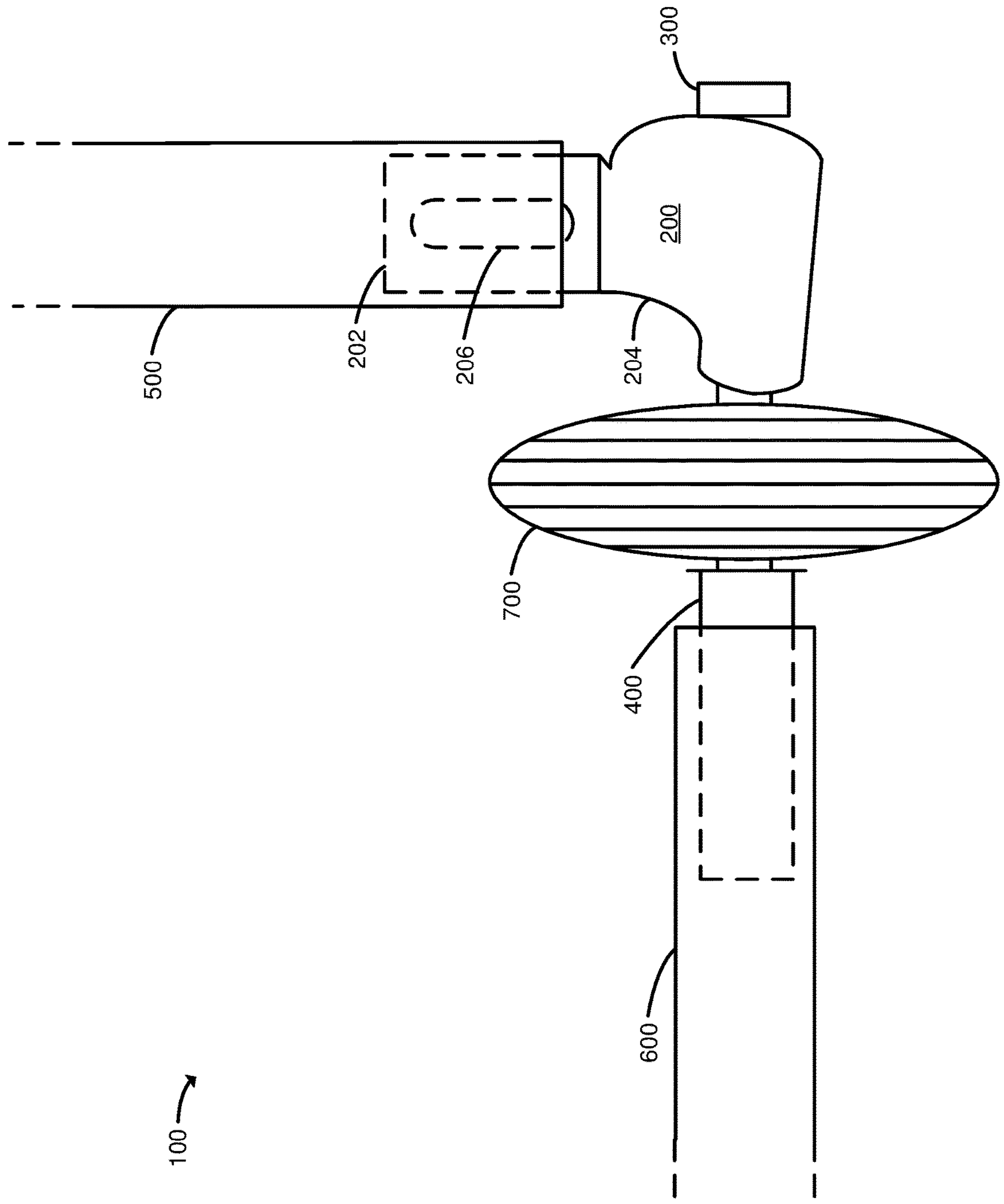
FIG. 5B illustrates a schematic diagram of a sideview of a bracket having a male connector fed therethrough and a female receiver together supporting a wheel, altogether receiving structural supports.
Figure 5C:
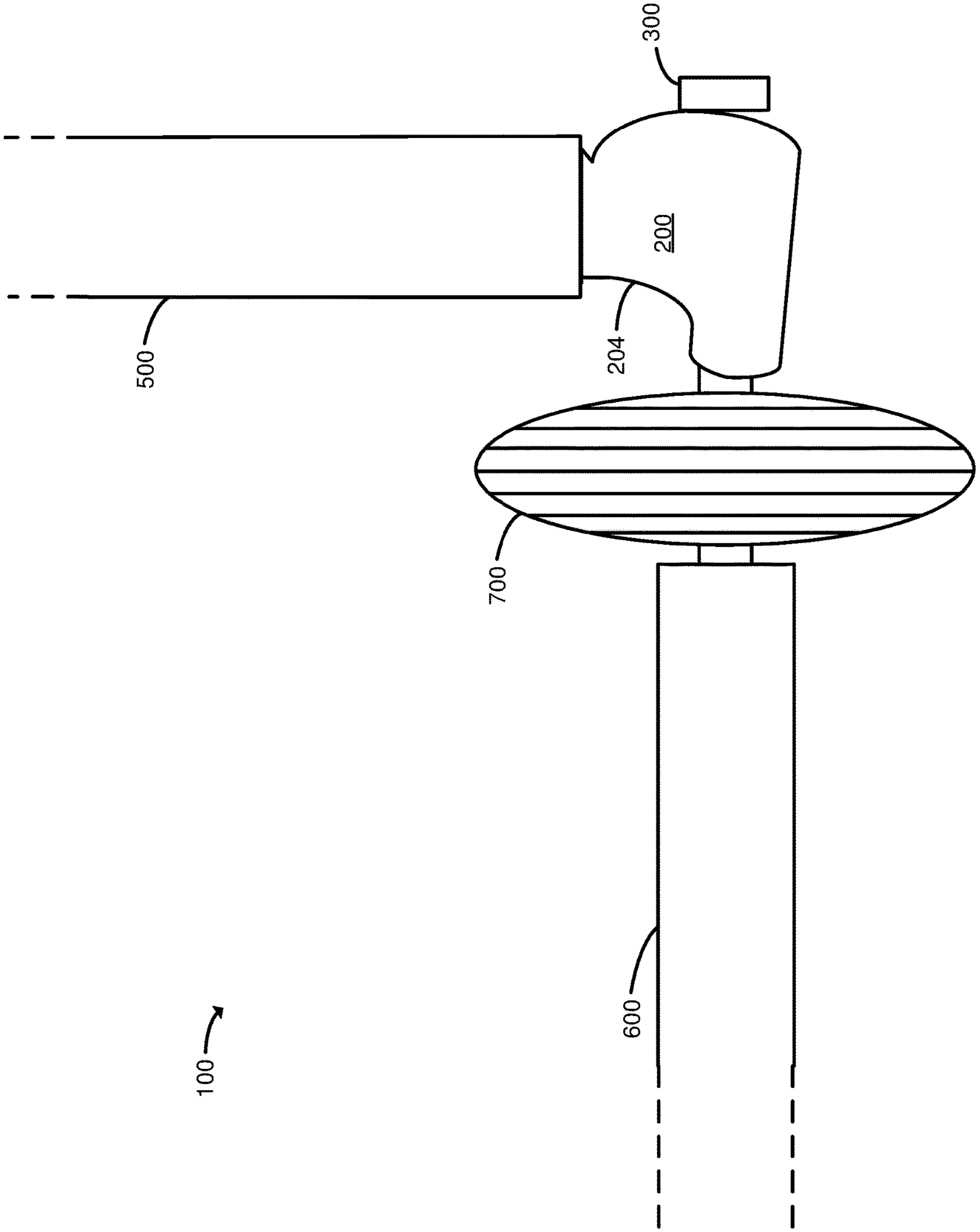
FIG. 5C illustrates a schematic diagram of a sideview of a bracket and male/female connector/receiver supporting a wheel with structural supports in place.

FIG. 5B illustrates another view of a schematic diagram of a side view 500 of a bracket according to the principles of the present disclosure. The vertical structural support 500 and the horizontal structural support 600 may be sized to fit over the bracket 200 head and receiver 400 respectively. The vertical structural support 500 may slidably fit over the bracket head and may optionally be secured by an additional bolt, screw, or other comparable securing means. The horizontal structural support 600 may likewise slidably fit over the receiver and may optionally be secured by an additional bolt, screw, or other comparable securing means. FIG. 5C illustrates another view of a schematic diagram of a side view of a bracket 200 according to the principles of the present disclosure. In FIG. 5C, the horizontal structural support 600 and vertical structural support 500 are fully disposed onto the receiver and the bracket 200 and secured. Once secured, the horizontal structural support 600 and vertical structural support 500 form an angle with the bracket 200, with the bracket 200 able to form a corner of a gate frame.

Figure 5D:
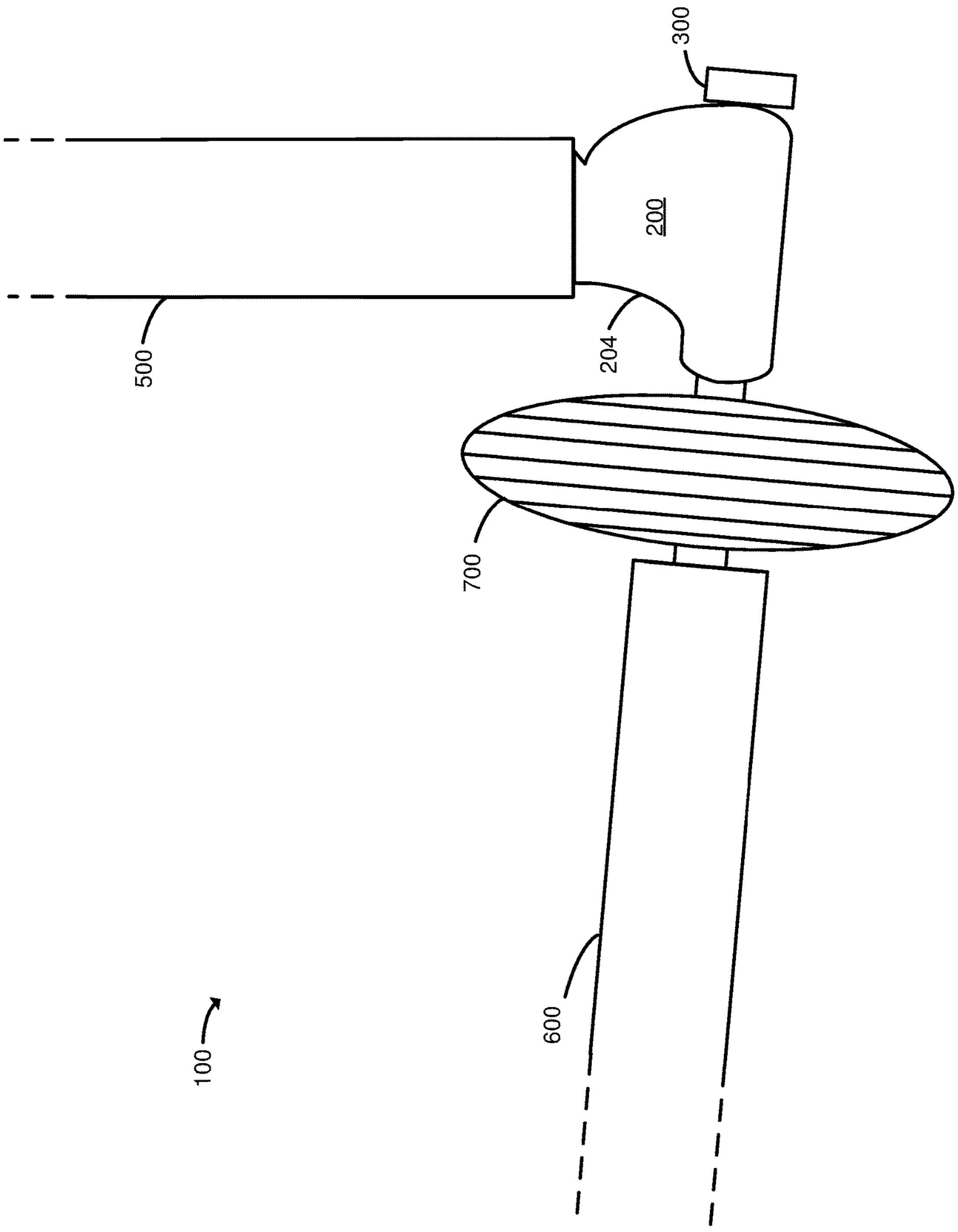
FIG. 5D illustrates a schematic diagram of a sideview of a bracket and male/female connector/receiver supporting a wheel with structural supports in place wherein the bolt of the bracket is adjusted to alter the angle of the wheel.

FIG. 5D illustrates a view of a schematic diagram of a side view of a bracket 200 according to the principles of the present disclosure. In some implementations, once a bracket base 204 is secured in a position according to a user's liking, a user may desire to lower the connector 300 to angle the wheel 700. A user may want to do so in order to position the wheel 700 to match the grade of a slope a gate or fence positioned on a slope. The connector 300 may be freely adjusted within the rear through-hole to give the user a variety of options of degrees at which the connector 300 and wheel 700 may be positioned. In some implementations instead of a wheel, a user may prefer some other item in its place. The item could include a stand, a locking mechanism, or some other type of suitable gate or fence accessory in implementations utilizing a gate or fence. In other implementations, other items that may accompany or attach to a bracket and connector as shown may be suitable. The bracket may come in a variety of sizes and be capable of greater or lesser degrees of adjustment than what is shown. Those skilled in the art will appreciate the variety of angles and sizes possible.

Figure 6:
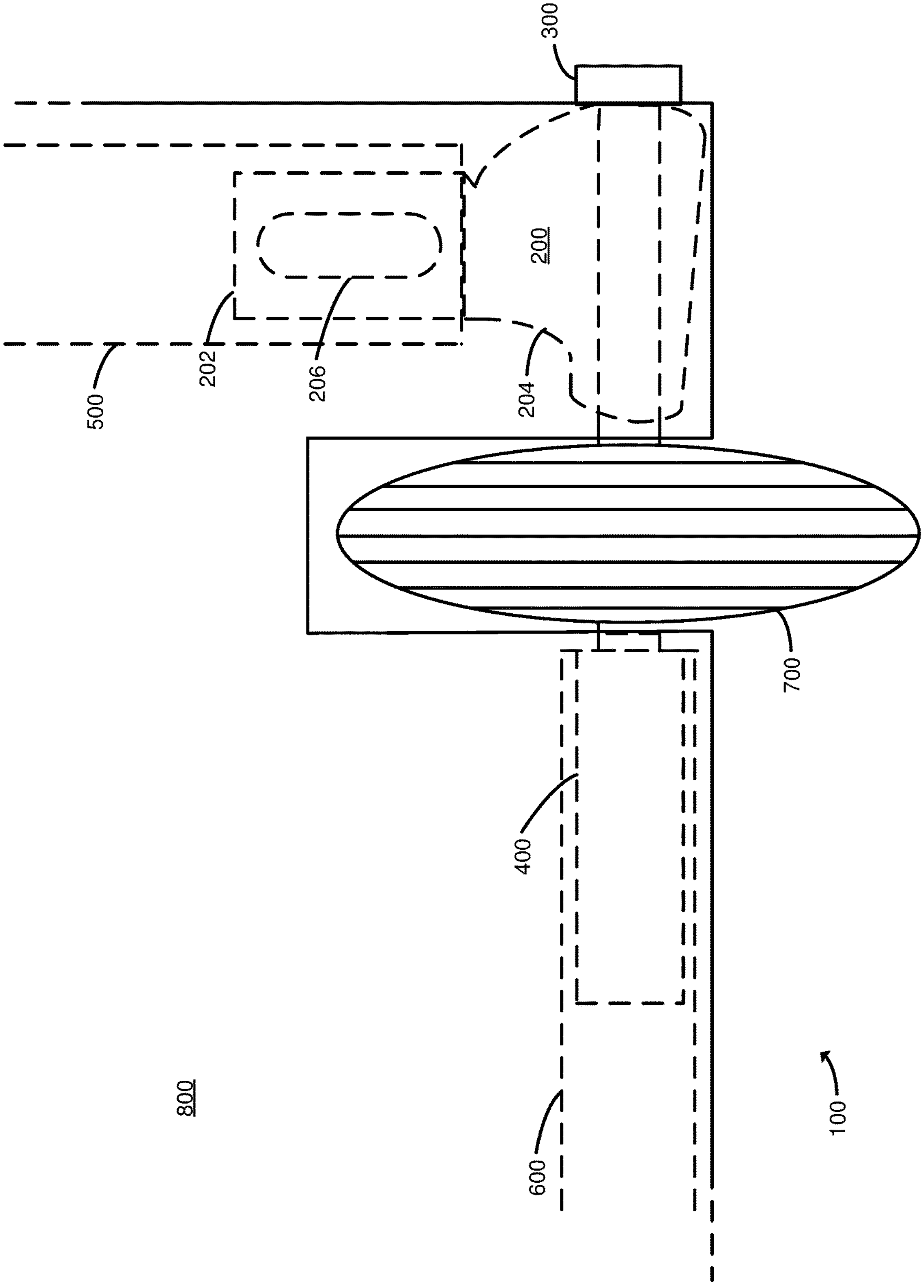
FIG. 6 illustrates a schematic diagram of a cutaway view of a bracket having a male/female connector/receiver supporting a wheel with structural supports in place altogether disposed within a panel.

FIG. 6 illustrates a cutaway view of a bracket 200 according to the principles of the present disclosure disposed within a panel 800. The panel 800 may comprise a gate or door of a fence. The bracket may be disposed within the panel 800 to support the wheel 700 and the horizontal structural support 600 and vertical structural support 500 in order to form or support a frame (not shown) of a gate or door, of which the bracket 200 may form a corner in that frame. The wheel 700 may be used to facilitate opening and closing of a gate or door according to a user's needs.

Figure 7:
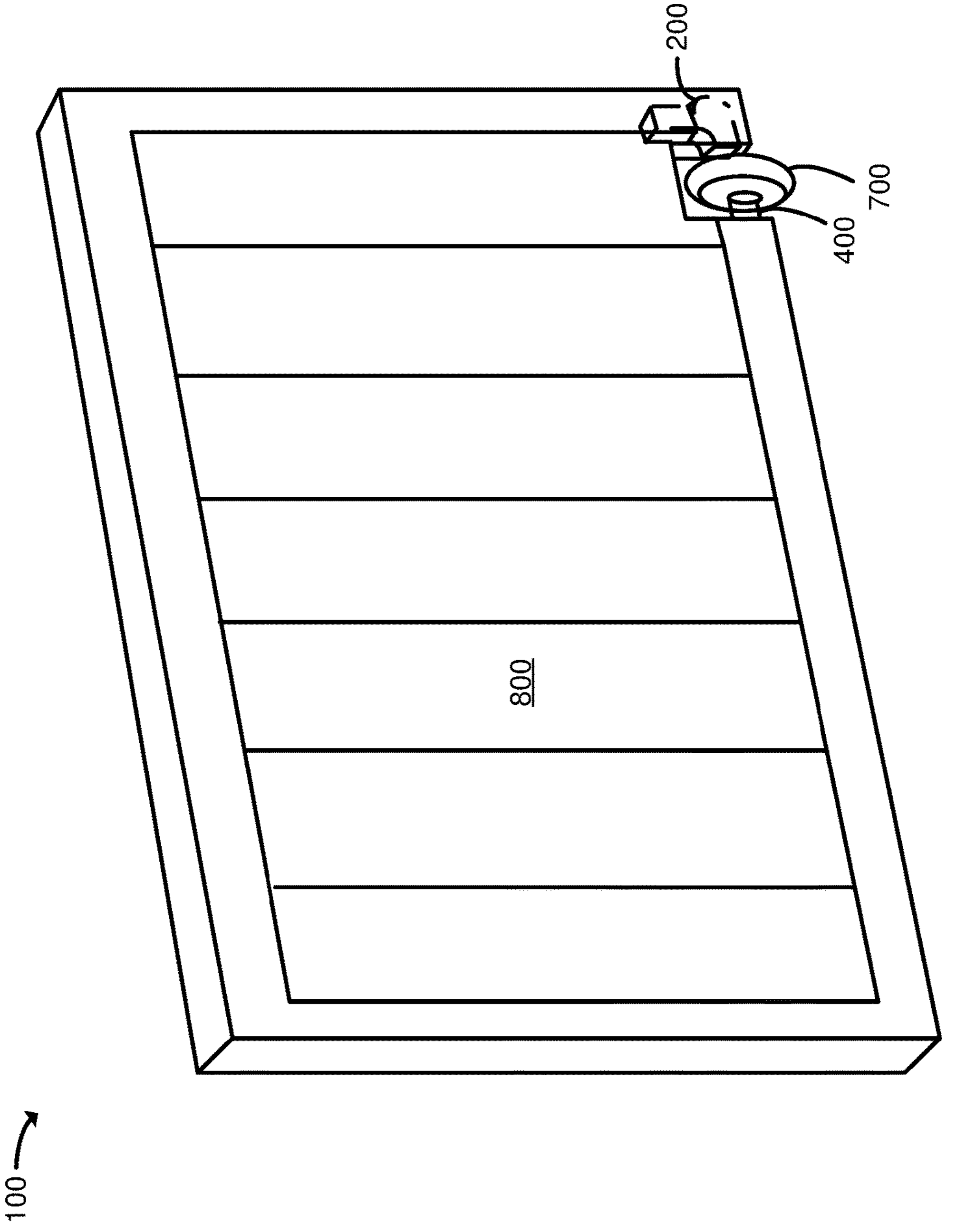
FIG. 7 illustrates a perspective view of a bracket disposed within a panel.
Figure 8:
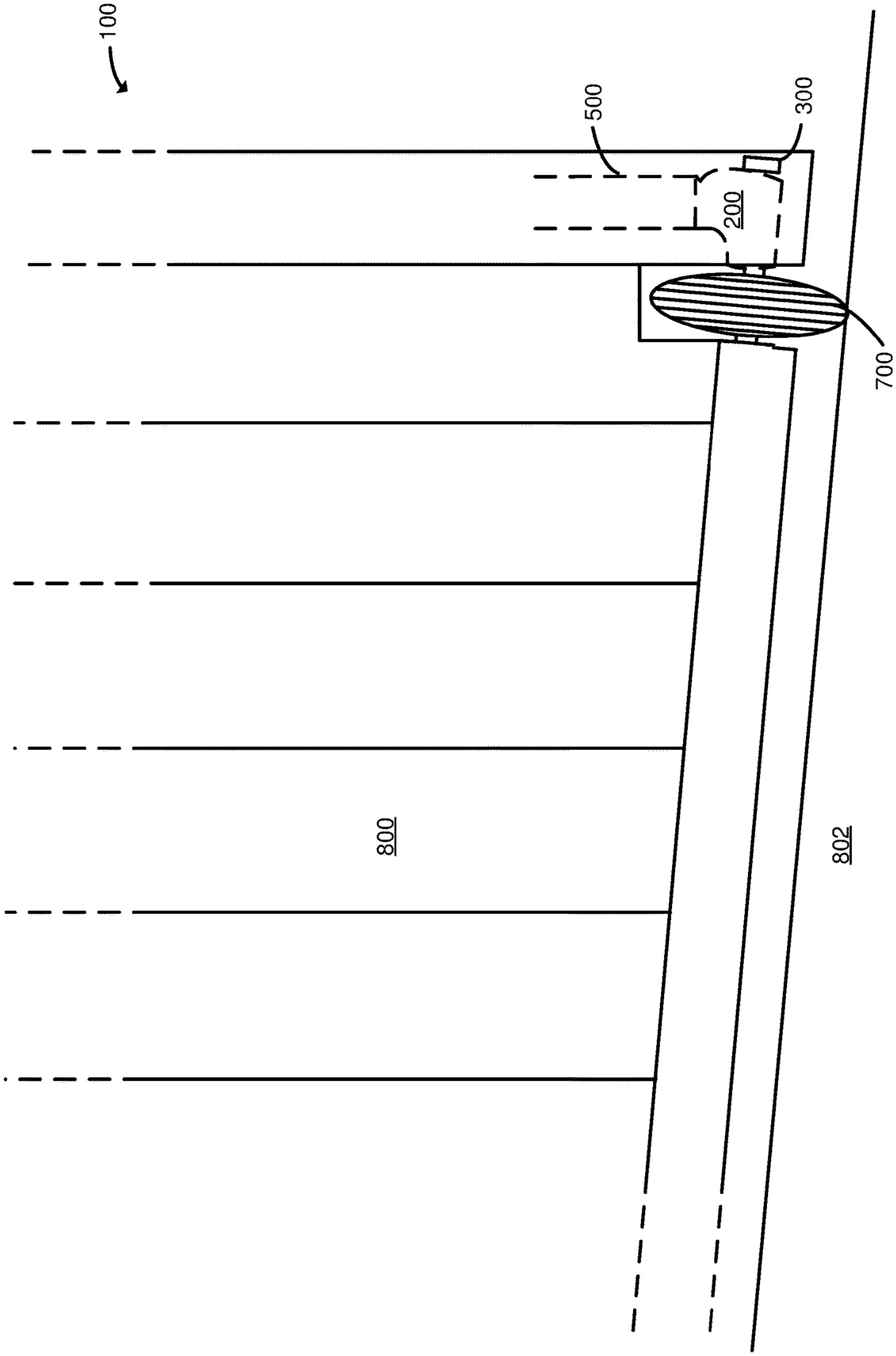
FIG. 8 illustrates a front view of a panel positioned on an incline with the wheel and bracket adjusted in relation to the incline.

FIG. 7 illustrates a schematic diagram of a bracket 200 according to the principles of the present disclosure disposed within a panel 800. The panel 800 may be a gate or door of a fence or similar structure and the bracket 200 may form a corner of such a gate or door. The bracket connector (seen in FIG. 3) and bracket receiver 400 may be adjusted such that the wheel 700 makes contact with the ground on which the panel 800 is positioned. The bracket 200 may be freely adjusted to suit a variety of different angles of surfaces. Manipulating the connector (see FIG. 3) within the rear through-hole (not shown) of the bracket 200 may influence the angle of the receiver 400 and thus the angle of the wheel 700. Seen in FIG. 8, the connector 300 within the bracket 200 may be adjusted to align a wheel 700 to suit a panel 800 positioned on a slope, incline, or other grade of surface 802. A user may adjust the connector 300 within the bracket 200 to adjust the overall angle of the wheel 700 before or after installation of the bracket 200 into a panel 800 which may resemble a gate, fence, or other installation. Once installed, a bracket 200 may be joined to the vertical structural support 500 disposed within the panel 800, and in such cases adjusting the bracket 200 itself may not be possible, as such a user may use the connector 300 to adjust a wheel 700 angle. When adjusting, the bracket may allow for a range from 0° to 8° degrees of variance with respect to the wheel 700 in some implementations. This variance may apply to an angle of an incline of a surface 802 on which a panel 800 is positioned in some implementations. In others, the variance may refer to the positioning of a wheel 700 or similar item disposed between the bracket 200 and the panel 800. In other implementations, different sizes and scales of bracket may allow for more or less ranges of variance in adjustability.

Reference throughout this specification to "an example" means that a particular feature, structure, or characteristic described in connection with the example is included in at least one implementation of the present disclosure. Thus, appearances of the phrase "in an example" in various places throughout this specification are not necessarily all referring to the same implementation.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various implementations and examples of the present disclosure may be referred to herein along with alternatives for the various components thereof. It is understood that such implementations, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present implementations are to be considered illustrative and not restrictive.

Those having skill in the art will appreciate that many changes may be made to the details of the above-described implementations without departing from the underlying principles of the disclosure. The scope of the present disclosure should, therefore, be determined only by the following claims.

Examples. The following examples pertain to further implementations of the disclosure.

Example 1 is a bracket assembly for mechanically adjusting a component. The assembly comprises a bracket comprising a base, a surface defining a channel, a first opening, and a second opening, wherein the surface defining the channel is tapered between the first opening and the second opening. The assembly further comprises a connector and a receiver.

Example 2 is an assembly as in Example 1, wherein the connector mates with the receiver by entering the second opening and passing through the channel and extends out of the first opening into the receiver.

Example 3 is an assembly as in Examples 1 or 2, wherein the connector is pivotably adjustable within the second opening.

Example 4 is an assembly as in any of Examples 1-3, wherein a first sidewall defines the first opening and wherein the first sidewall comprises a first radius configured to facilitate adjustment of the bracket assembly relative to the receiver.

Example 5 is an assembly as in any of Examples 1-4, wherein a second sidewall defines the second opening and wherein the second sidewall comprises a second radius configured to facilitate adjustment of the bracket assembly relative to the connector.

Example 6 is an assembly as in any of Examples 1-5, wherein the second opening is larger than the first opening.

Example 7 is an assembly as in any of Examples 1-6, wherein the difference in size between the first opening and the second opening is a ratio of about 1:3.

Example 8 is an assembly as in any of Examples 1-7, wherein the taper angle of the surface defining the channel falls within a range of about 20 to about 40 degrees.

Example 9 is an assembly as in any of Examples 1-8, wherein the second opening comprises a rounded rectangle shape.

Example 10 is an assembly as in any of Examples 1-9, further comprising a head, wherein the head is perpendicular to a horizontal axis of the base, and wherein the head is configured to be inserted into a structural support member.

Example 11 is an assembly as in any of Examples 1-10, wherein the head is positioned such that the head is offset from a vertical axis that is perpendicular to a horizontal axis of the surface defining the channel.

Example 12 is a system. The system comprises a gate and a bracket assembly. The bracket assembly comprises a bracket comprising a base, a surface defining a channel, a first opening, a second opening, wherein the surface defining the channel is tapered between the first opening and the second opening. The bracket assembly further comprises a connector and a receiver.

Example 13 is a system as in Example 12, wherein the connector mates with the receiver by entering the second opening and passing through the channel and extending out of the first opening into the receiver.

Example 14 is a system as in Example 12 or 13, wherein the connector is pivotably adjustable within the second opening.

Example 15 is a system as in any of Examples 12-14, wherein the gate comprises a bottom rail that is positionable relative to and above a ground surface, and wherein adjustment of the connector within the second opening allows the bottom rail to remain substantially parallel to the ground surface having an incline from about 0 degrees to about 8 degrees.

Example 16 is a system as in any of Examples 12-15, wherein a first sidewall defines the first opening and wherein the first sidewall comprises a first radius configured to facilitate adjustment of the bracket assembly relative to the receiver.

Example 17 is a system as in any of Examples 12-16, wherein a second sidewall defines the second opening and wherein the second sidewall comprises a second radius configured to facilitate adjustment of the bracket assembly relative to the connector.

Example 18 is a system as in any of Examples 12-17, wherein the second opening is larger than the first opening.

Example 19 is a system as in any of Examples 12-18, wherein the difference in size between the first opening and the second opening is a ratio of about 1:3.

Example 20 is a system as in any of Examples 12-19, wherein the taper angle of the surface defining the channel falls within a range of about 20 degrees to about 40 degrees.

Example 21 is a system as in any of Examples 12-20, further comprising a head, wherein the head is perpendicular to a horizontal axis of the base, and wherein the head is configured to insert into a structural support member of the gate.

What is claimed is:

1. A bracket assembly for mechanically adjusting a component comprising:
- a bracket comprising:
  - a base,
  - a surface defining a channel,
  - a first opening, and
  - a second opening;
  - wherein the surface defining the channel is tapered between the first opening and the second opening;
- a connector extending through the channel; and
- a receiver:
- wherein the tapered surface allows angular adjustment between the connector and the bracket.

2. The bracket assembly of claim 1, wherein the connector mates with the receiver by entering the second opening and passing through the channel and extends out of the first opening into the receiver.

3. The bracket assembly of claim 1, wherein the connector is pivotably adjustable within the second opening.

4. The bracket assembly of claim 1, wherein a first sidewall defines the first opening and wherein the first sidewall comprises a first radius configured to facilitate adjustment of the bracket assembly relative to the receiver.

5. The bracket assembly of claim 1, wherein a second sidewall defines the second opening and wherein the second sidewall comprises a second radius configured to facilitate adjustment of the bracket assembly relative to the connector.

6. The bracket assembly of claim 1, wherein the second opening is larger than the first opening.

7. The bracket assembly of claim 6, wherein the difference in size between the first opening and the second opening is a ratio of 1:2 to 1:3.

8. The bracket assembly of claim 1, wherein the taper angle of the surface defining the channel falls within a range of 20 to 40 degrees.

9. The bracket assembly of claim 1, wherein the second opening comprises a rounded rectangle shape.

10. The bracket assembly of claim 1, further comprising a head, wherein the head is perpendicular to an angle offset from a horizontal axis of a bottom surface of the base, and wherein the head is configured to be inserted into a structural support member.

11. The bracket assembly of claim 10, wherein the head is positioned such that the head is perpendicular to a horizonal axis of the channel defined by the surface defining the channel.

12. A system comprising:
- a gate; and
- a bracket assembly comprising:
  - a bracket comprising:
    - a base,
    - a surface defining a channel,
    - a first opening, and
    - a second opening;
    - wherein the surface defining the channel is tapered between the first opening and the second opening,
  - a connector extending through the channel, and
  - a receiver,
  - wherein the tapered surface allows angular adjustment between the connector and the bracket.

13. The system of claim 12, wherein the connector mates with the receiver by entering the second opening and passing through the channel and extending out of the first opening into the receiver.

14. The system of claim 12, wherein the connector is pivotably adjustable within the second opening.

15. The system of claim 14, wherein the gate comprises a bottom rail that is positionable relative to and above a ground surface, and wherein adjustment of the connector within the second opening allows the bottom rail to remain substantially parallel to the ground surface having an incline from 0 degrees to 8 degrees.

16. The system of claim 12, wherein a first sidewall defines the first opening and wherein the first sidewall comprises a first radius configured to facilitate adjustment of the bracket assembly relative to the receiver.

17. The system of claim 12, wherein a second sidewall defines the second opening and wherein the second sidewall comprises a second radius configured to facilitate adjustment of the bracket assembly relative to the connector.

18. The system of claim 12, wherein the second opening is larger than the first opening.

19. The system of claim 18, wherein the difference in size between the first opening and the second opening is a ratio of 1:2 to 1:3.

20. The system of claim 12, wherein the taper angle of the surface defining the channel falls within a range of 20 degrees to 40 degrees.

21. The system of claim 12, further comprising a head, wherein the head is perpendicular to a horizontal axis of the base, and wherein the head is configured to insert into a structural support member of the gate.

* * * * *